June 16, 1942.  L. A. NELSON  2,286,758
AIR CONDITIONING SYSTEM
Filed March 25, 1939
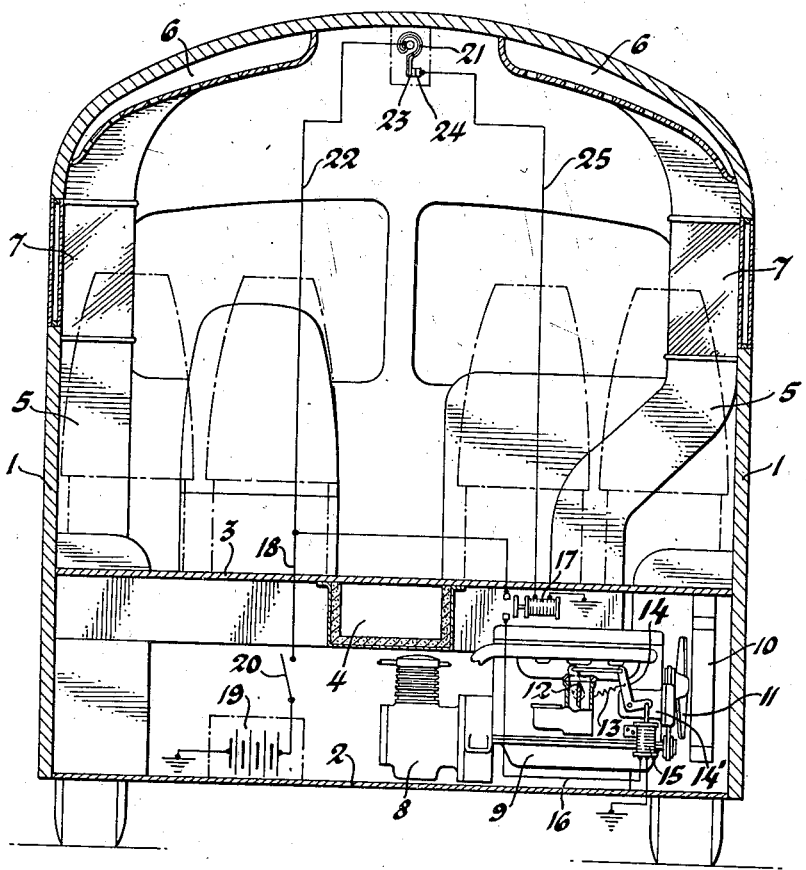
Fig. 1
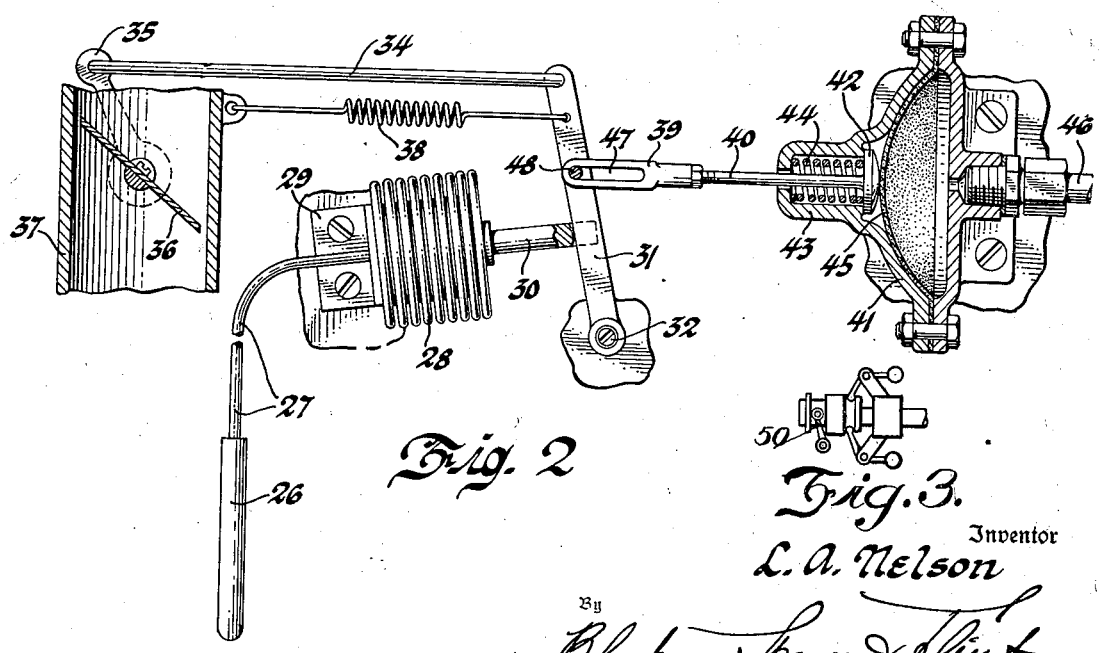
Fig. 2
Fig. 3
Inventor
L. A. Nelson
By
Blackmon, Spencer & Flint
Attorneys Patented June 16, 1942

2,286,758

UNITED STATES PATENT OFFICE 2,286,758

AIR CONDITIONING SYSTEM

Laurence A. Nelson, Birmingham, Mich., assignor to Yellow Truck & Coach Manufacturing Company, Pontiac, Mich., a corporation of Maine Application March 25, 1939, Serial No. 264,050

5 Claims. (Cl. 62—117)

This invention relates to air conditioning systems and more particuarly to an operating control mechanism especially adapted for use with a system incorporated in a moving vehicle such as a motor passenger coach.

In general a cooling unit consists of a compressor, a condenser, a refrigerant reservoir, a metering orifice (i. e., an expansion or pressure reducing valve), and an evaporator (i. e., cooling coil). The evaporator is positioned in the path of air entering passenger compartment. According to usual practice the compressor is driven intermittently as determined by heat rejection requirements. To avoid troubles experienced with an intermittently operated internal combustion engine, particularly in automatic cranking of the engine to get it started, it is now proposed to modify its speed, thereby allowing it to run more nearly continuously for proper functioning of the conditioning system.

It is, therefore, an object of the present invention to provide an automatic control system for modifying engine speed and, consequently, the rate of heat absorption according to temperature conditions within the passenger compartment. In a preferred embodiment of the invention the rate of engine speed is regulated by adjustment of the throttle or engine fuel feed under control of a thermostat or thermostatic switch exposed to recirculated air or the air inside the coach.

A further object of the invention is to provide an arrangement of parts to insure the throttle being fully opened regardless of thermostat setting, while the engine is being cranked and accelerated to a sustained operating speed at the start of engine operation.

Additional objects and advantages of the invention will become apparent during the course of the following specification having reference to the accompanying drawing wherein Figure 1 is a transverse section looking toward the front of a motor coach and illustrating one embodiment of the invention, Figure 2 is an enlarged fragmentary view with parts in section of a modified control arrangement and Figure 3 illustrates schematically an engine speed responsive device.

The motor coach illustrated includes a pair of side walls 1—1 and a bottom wall 2 together with an elevated deck 3 on which the passenger seats are located. Beneath the seating deck 3 the space is utilized for stowing luggage and for the location of the operating mechanism of the cooling system. Air from inside the passenger space is exhausted through a series of spaced floor openings into a longitudinally extended duct 4 under the seating deck 3 and passed through an evaporator or cooling coil and the cooled and dehumidified air then passes into a pair of laterally extending branch ducts leading into a pair of vertical risers 5—5 extending upwardly beside each side wall of the coach to longitudinally extending delivery ducts 6—6 positioned along each side of the vehicle roof. If desired each riser may include a transparent section 7 in the region of the observation windows in the side walls so as not to obstruct vision and each of the roof ducts has in its underside a number of perforations for distributing the conditioned air throughout the length of the body.

The circuit for the refrigerating medium in this instance includes a compressor 8 driven by an internal combustion engine 9 and a condenser 10 which is cooled by an air flow induced by an engine driven fan 11. In the case of a gasoline engine the speed of operation is dependent on the amount of fuel mixture delivered to the cylinders and the delivery of fuel mixture may be controlled by an adjustable throttle or butterfly valve 12 between the carburetor and intake manifold. The throttle valve is shown in Figure 1 in fully opened position and is held in this position by the tension spring 13 acting on the throttle crank arm 14. The crank arm 14 in this instance is keyed on the operating shaft of an engine driven governor 14', which may be of any suitable type, dependent for operation upon the action of centrifugal weights to position the throttle for maintaining substantially constant engine speed. With increase in engine speed the governor weights tend partially to close the throttle against spring pressure. A suitable governor may be generally similar to that illustrated in Figure 3 wherein a pair of weighted arms are pivotally carried by an engine driven shaft for an outward flying tendency and are linked by means of a sliding shaft collar 50 to a crank arm fixed to the operating rockshaft for the crank arm 14.

Additional control for the throttle, acting irrespective of governor setting and responsive to inside coach temperature, includes the connection of the crank or governor arm 14 with a plunger of a solenoid 15 contained within the electrical circuit, which is opened or closed by a relay switch in turn controlled by a thermostatic switch exposed to air inside the coach. It is to be understood that the use of a relay is according to approved electrical practice, but is not essential to the proper function of the control and also that any of several types of thermostatic switches may be employed. A satisfactory control may involve the use of a pair of similar switches arranged to open and close contact points at slightly different temperatures. To simplify the disclosure the control circuit illustrated has the solenoid 15 connected through the line 16 and relay switch 17 with the power line 18 leading from the battery 19, both the solenoid and battery being grounded to complete the circuit. Optionally a main line switch 20 can be employed to open the circuit when the vehicle is out of operation.

As before indicated operating current to open the relay switch 17 is supplied under control of a thermostat located at a suitable point within the body interior or optionally within the air ducts so as to be exposed to air within the coach. For the sake of simplicity the thermostat is illustrated as consisting of a bimetallic element 21 connected by the line 22 with the current supply line 18 and provided with a movable contact 23 to engage a fixed contact 24 connected by the line 25 with one side of the relay coil 17, the other end of the coil being grounded. When the inside temperature of the coach exceeds a predetermined thermometer reading, for example, 73° F., the contacts 23 and 24 are closed by the response of the bimetallic element 21 and current flows to the relay 17 to open the switch controlling current flow to the solenoid 15. Under influence of the spring 13 the throttle moves toward fully opened position allowing the engine to operate the cooling system at full capacity. During the full capacity operation of the cooling system the speeed of the engine is maintained substantially constant through adjustment of the fuel feed throttle under control of the engine speed responsive governor 14', which as before indicated is of the conventional engine driven flyball type. In response to variations in engine speed the centrifugal weights move in or out and the movement is transmitted to the throttle to adjust its setting for engine operation at the desired rate of speed. This is in accordance with well known principles. Control of throttle setting is taken away from the speed responsive governor and irrespective of governor action the throttle is moved to idle position through energization of the solenoid 15 whenever there is no demand for cooling. In other words, when the inside temperature drops below the predetermined point, the reaction of the bimetallic element 21 opens the contacts 23 and 24 allowing the switch relay 17 to close and thereby actuate the solenoid 15 for overcoming the spring 13 and moving the throttle valve 12 to idle position. Control of the throttle is thus divorced from the governor and with the throttle held positively in idle position the engine operates slowly but continues to run the cooling system.

Under ordinary summer weather conditions the amount of heat absorbed from the circulating air by the cooling system operating at idle engine speed, will be somewhat less than will be necessary to maintain inside coach temperature at the preselected level and as soon as additional heat extraction is demanded the switch relay 17 will again be energized to cut out the solenoid 15 for opening the throttle and increasing engine speed. The thermostatic switch heretofore mentioned controls the modulation of engine speed through the solenoid. A second and similar thermostatic switch may be employed to control a circuit for automatically starting and stopping the engine.

In lieu of electrically actuated parts the mechanical linkage arrangement shown in Figure 2 may be employed for modulating engine speed in accordance with temperature demand. The temperature responsive device is illustrated as including a bulb 26 to be exposed to the air inside the coach and to be connected by a tube 27 with an expansible bellows 28. These parts will be filled with a suitable thermally responsive fluid so that an increase in temperature at the bulb will cause expansion of the fluid and distention of the bellows 28. One end of the bellows is secured to a fixed anchorage by a bracket 29 while the opposite or movable end is provided with a projecting stem 30 having a bifurcated end to engage a swinging lever 31 in spaced relation to the fulcrum shaft 32. The free end of the lever 31 is connected by a link 34 to the crank arm 35 for the throttle 36 located within the fuel feed conduit 37. A tension spring 38, interposed between a mounting ear on the conduit 37 and the lever 31, tends to keep the lever 31 engaged with the bifurcated end of the stud 30 and incidentally return the throttle to idle position upon contraction of the bellows 28. The speed of the engine and, therefore, the rate of heat absorption, will be dependent upon throttle position and the position of the throttle will be varied in accordance with inside temperature of the coach which governs the expansion and contraction of the bellows 28. In this case no engine speed responsive device is employed and the throttle governing lever 31 is responsive wholly to coach interior temperature changes.

To facilitate starting of the engine with fully opened throttle, means may be provided to open the throttle irrespective of temperature and thermostat setting. This additional throttle control device may consist of a clevis 39 adjustably mounted on the end of a spring pressed headed stem 40 and engaging with the operating lever 31. The stem 40 is shown projected into a two-part casing 41 with its head 42 abutting a shoulder or seat of the casing 41. A tubular extension 43 of the casing encloses and seats one end of a compression spring 44 which engages the head and biases the operating link 40 in a direction tending to open the throttle 36. To oppose the force of the spring 44 and seat the head 42 while the engine is in normal operation, a flexible diaphragm 45 is secured within the casing 41 and bears against the head 42 by the action of pressure thereon produced as an incident to engine operation. For example, a source of pressure dependent upon engine operation might be the engine operated oil pump forming a regular part of the engine lubricating system and the pressure side of the pump may be connected by a pipe or conduit 46 with the pressure side of the diaphragm 45. Optionally atmospheric pressure may be the moving agency if the casing on the opposite side of the diaphragm is connected with the intake manifold of the engine or other suitable point of engine suction. In either event, the absence of working pressure on the diaphragm 45 will allow the spring 44 to come into action and swing the lever 31 to open throttle position and out of engagement with the operating stem 30.

The connection between the clevis 39 and the lever 31 is in the nature of an elongated slot 47 formed in the clevis to receive the pin 48 carried by the lever 31. By reason of this pin and slot connection the projected position of the stem 40 will not interfere with throttle adjustment under control of temperature.

I claim:

1. Means operating automatically in accordance with compartment temperature demands to vary the speed of the driving engine for a continuously operating cooling unit, including an adjustable engine throttle, means solely responsive to compartment temperature for adjusting said throttle during normal engine operation for the control of engine speed, other means tending to open the throttle and means responsive to engine operation to render said last mentioned means ineffective.

2. Means operating automatically in accordance with compartment temperature demands to vary the speed of the driving engine for a continuously operating cooling unit, including an adjustable engine throttle, temperature controlled means for setting the throttle during normal engine operation, other means acting independently of the temperature controlled means for biasing the throttle toward open position when the engine is out of operation and engine actuated means to overcome the action of said biasing means.

3. For use with a continuously operating cooling mechanism having a variable rate of speed dependent on heat rejection requirements in the compartment to be cooled, control apparatus for said mechanism including an engine fuel throttle movable between open and idle positions, spring means biasing the throttle toward one of said positions, and a pair of individually separate throttle operating devices each active independently of the other on the throttle for moving the same toward its other position in opposition to the biasing force of said spring means, one of said devices being responsive solely to compartment inside temperature and the other of said devices being governed in its response by engine operation, one of said devices serving normally and during the time the other device is inactive, to control throttle setting throughout the range between its open and idle positions and the other device serving in action to cancel completely the throttle control by the normal control device and positively to set the throttle in one of said positions.

4. In combination with a variable speed engine and a compressor forming part of a refrigerating system for cooling a compartment and operable at high speeds to meet maximum cooling demand and at low speed to meet minimum cooling demand of means permanently coupling the engine and the compressor for conjoint and continuous operation at all times throughout the range of engine speed, an engine fuel feed throttle operable to regulate speed of the compressor by varying the amount of fuel feed to the engine, spring means biasing the throttle to fully open position, engine speed responsive means active on the throttle to set the same against the spring biasing force for constant compressor speed at times of maximum cooling demand, and speed modulator means governed solely by compartment temperature to compel slower operation of the compressor for minimum cooling demand including a solenoid active on the throttle when energized to hold the same in idle position irrespective of said speed responsive means, an electrical circuit containing said solenoid and a thermostatically operated switch in the circuit responsive to compartment temperature to energize the solenoid and thereby take throttle control away from the speed responsive means when the compartment temperature demands minimum cooling at low compressor speed and to open the circuit for deenergizing the solenoid and thereby restoring throttle control by the speed responsive means when compartment temperature demands maximum cooling at high compressor speed.

5. In combination, a variable speed compressor in a compartment cooling system operable at high speed for maximum cooling demand and at low speed for minimum cooling demand, a prime mover coupled with the compressor to drive the same at said high and low speeds, a speed controller governing the rate of prime mover operation and movable between high and low speed positions, spring means biasing the controller toward high speed position, a speed responsive device operatively connected with the controller to set the same against the biasing force of said spring for constant compressor speed during high speed operation, a solenoid operatively connected with the controller and arranged when energized to overcome completely the action of the speed responsive device and to set the controller at low speed position and means responsive to compartment temperature below a given value for energizing said solenoid.

LAURENCE A. NELSON.